United States Patent Office 3,389,286
Patented June 18, 1968

3,389,286
ELECTRONIC DEVICES USING CERTAIN POLY-
VINYLALCOHOL CYANOALKYL ETHERS AS A
DIELECTRIC
Hideo Takahashi and Masayuki Emoto, Tokyo-to, Saburo
Imoto and Osamu Ohara, Kurashiki-shi, and Toshiro
Masuda, Saijo-shi, Japan, assignors to Kabushiki Kaisha
Hitachi Seisakusho, Tokyo-to, and Kurashiki Rayon
Kabushiki Kaisha, Okayama-ken, Japan, both Japanese
joint-stock companies
Filed May 3, 1965, Ser. No. 452,553
Claims priority, application Japan, May 2, 1964,
39/24,955
2 Claims. (Cl. 313—108)

ABSTRACT OF THE DISCLOSURE

An electronic device consisting of at least two mutually opposed electrodes and a dielectric interposed therebetween. The dielectric contains at least one polyvinyl alcohol cyanoalkyl ether and electroluminescent phosphors dispersed therein, and a dielectric matrix of polyvinyl alcohol cyanoalkyl ether.

---

This invention relates to improvements in or relating to electronic devices of the type having mutually opposed electrodes with dielectric material interposed therebetween.

It is a general object of the present invention to provide electronic devices having high insulative value, large capacity, and low electrical loss.

Other objects of the invention are to make possible miniaturization of electronic devices of the above stated character and to facilitate their production.

The above stated properties of high insulative value, large capacity, and low electrical loss are highly desirable for electronic devices, such as capacitors and electroluminescent devices (panels), of capacitor construction wherein, between mutually opposed electrode pieces, a dielectric layer is disposed to isolate and insulate the electrode pieces from each other.

For example, electroluminescent devices ordinarily have dielectrics in which semiconductors such as electroluminescent phosphors have been dispersed, and which are interposed between opposed electrodes, and voltage is applied to the opposed electrodes to impart elecrtical energy to the dispersed particles. Accordingly, it is desirable that the dielectrics to be so used be not mere insulating materials but insulating materials which function to transmit electrical energy.

Moreover, many of the electroluminescent materials used widely at present for electroluminescent elements are of the zinc sulphide type, which have high electric field dependency of luminescent intensity of values which are reported to be proportional to from the third to the sixth power of the electric field strength. For this reason, it is necessary, of course, to use a small electrode gap in order to produce a bright electroluminescent element, and it is also necessary to use dielectrics having at least the properties of high breakdown voltage and high dielectric constant. That is, the higher the dielectric constant of the binder is, the easier will the concentration of the electrical energy to the dispersed phosphor particles become, and brighter luminescent elements for the same external field can be produced.

In addition, as a method for supplying electrical energy to all particles dispersed within a dielectric, there are some cases in which it is advantageous to use a dielectric having a dielectric loss of an order such that heat generation is not entailed since the absolute value of power consumption of an electroluminescent element is extremely small. However, in the general case when a dielectric of large dielectric loss is used, the increase in the current of the same phase as the voltage passing between the electrodes gives rise to an increase in the power consumption and a decrease in the efficiency. A further undesirable result is that the life of the semiconductor particles is shortened by the generated heat.

Although various synthetic resins are presently being produced as insulators, there are none which, by themselves, can produce a high dielectric constant. For this reason, attempts have been made to reduce viscous forces by adding plasticizers thereby to increase the apparent dielectric constant. However, in cases where the dielectric constant of the added plasticizers is small, the resultant dielectric constant may even become smaller, and in many instances effects such as that due to impurities existing in the plasticizers merely cause an increase in only the dielectric loss.

Since cyanoethyl cellulose, among the heretofore known dielectrics, has a relatively high dielectric constant, we experimentally produced some electroluminescent devices with the use of this dielectric. However, cyanoethyl cellulose has poor adhesivity with respect to glass and metals, and, even when it is formed as a film, pinholes and blushing are produced therein, whereby the breakdown voltage decreases, and the moisture absorption increases. For this reason, it was found that it is difficult to produce an electroluminescent device having a long serviceable life.

It is an object of the present invention to provide a new electronic device in which the above described disadvantages are eliminated, and which have highly desirable characteristics as will hereinafter be described more fully.

According to the present invention, briefly stated, there is provided an electronic device wherein between two or more mutually opposed electrode structures there is interposed, as a dielectric substance for isolating and insulating the electrode structures from each other, a polyvinyl alcohol cyanoalkyl ether or a substance containing the same.

For example, polyvinyl alcohol β cyanoethyl ether is cyanoethylated polyvinyl alcohol and is a substance which results when the hydrogen atom of the OH radical possessed by polyvinyl alcohol is converted with suitable degree of cyanoethylation into the radical [$CH_2CH_2CN$], the structural formula being as follows:

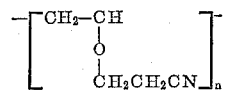

This resin has good transparency and at room temperature is a relatively soft solid having elasticity and a specific gravity of approximately 1.3. Furthermore, this resin differs from polyvinyl alcohol and is soluble in solvents such as acetone, acetonitrile, pyridine, and dimethyl formamide.

The nature and details of the invention will be more clearly apparent by reference to the following detailed description with respect to examples embodying the invention, when read in conjunction with the accompanying in which.

Figure 1:
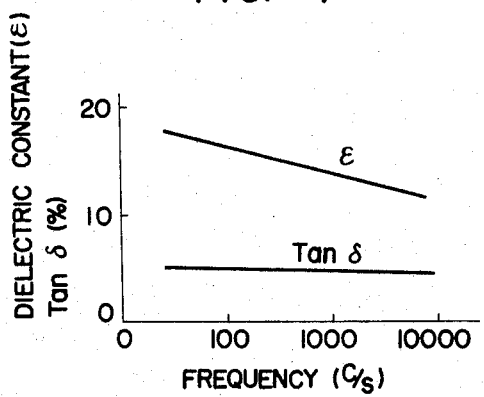
FIG. 1 is a graphical representation showing frequency characteristic curves of dielectric constant and tan δ of a dielectric material suitable for use in electronic devices according to the invention.

Referring to FIG. 1 showing the frequency characteristic curves of dielectric constant and tan δ of polyvinyl alcohol β cyanoethyl ether, the abscissa represents frequency, and the ordinate represents dielectric constant (ε) and tan δ (percent). These curves were obtained from the results of measurement with a sample of the above named dielectric having a thickness of 300 microns and a flat surface area of 10 cm.² Aluminum was deposited by evaporation on the two surfaces of this sample to form electrodes, and values of the equivalent electrostatic capacitance and equivalent effective resistance were measured by means of a dielectric loss measuring device of the Schering bridge type. Measured values of the dielectric constant at room temperature were from 17 to 18 at a frequency of 50 c./s. and 15 at a frequency of 1,000 c./s., which values are higher than those hitherto obtainable. Values of tan δ were from 5 to 6 percent.

In order to indicate fully the composition and arrangement of parts constituting the electronic devices according to the invention, the following examples of preferred embodiments of the invention are set forth, it being understood that these examples are presented as illustrative only, and that they are not intended to limit the scope of the invention.

Example 1

Figure 2:
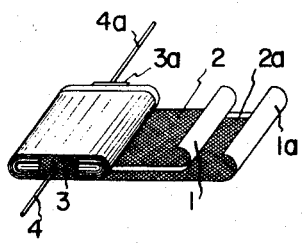
FIG. 2 is a perspective view showing a process of manufacturing one embodiment of an electronic device according to the invention.

A sheet of tin foil was adhered to a kraft paper which had been impregnated with polyvinyl alcohol cyanoethyl ether of a degree of cyanoethylation of 0.6 and polymerization of 1700, and the resulting assembly was wound into a tight roll. Lead-wires were attached to the electrodes, and then, by subjecting the roll to paraffin impregnation under vacuum, a capacitor type device was produced. This manufacturing process is shown in FIG. 2, in which kraft papers 1 and 1a prepared by impregnating said papers with polyvinyl alcohol cyanoethyl ether, tin foils 2 and 2a, electrodes 3 and 3a, and lead-wires 4 and 4a are respectively shown.

The electrostatic capacitance of this device was 0.009 microfarad, which was from 2.1 to 2.3 times that of a capacitor type of exactly the same construction but made of unimpregnated kraft paper.

Example 2

10 grams of polyvinyl alcohol cyanoethyl ether of a degree of cyanoethylation (substitution) of 0.6 and polymerization of 1,700 were dissolved in a liquid mixture of acetone and acetonitrile, and the resulting solution was painted on a smoothly ground metal foil and dried to produce a dielectric matrix layer of 100-micron thickness. An electrode of metal film was further deposited by vacuum evaporation on a part of 5-cm.² area of the dielectric matrix layer. The resulting device of flat plate capacitor form fabricated in this manner had an electrostatic capacitance of 0.0008 microfarad at a frequency of 50 c./s., which is two or more times that of a device of the same construction in which a substance such as nitrocellulose is used. Furthermore, in the above described device of the invention the film thickness can be made approximately four times that of an equivalent device in which an epoxy resin is used for the same electrostatic capacitance.

Example 3

Figure 3:
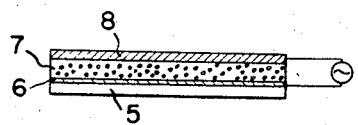
FIG. 3 is a sectional view showing a preferred embodiment of an electronic device according to the invention.

100 parts (by weight) of zinc sulphide phosphors having an electroluminescence were mixed with 100 parts (by weight) of polyvinyl alcohol cyanoethyl ether of cyanoethylation of 0.93, and the resulting mixture was dissolved in a liquid mixture of acetone and acetonitrile. As shown in FIG. 3, the resulting solution was applied by spraying onto a sheet of transparent conductive glass 5 having a first electrode 6 and dried to form a luminescent layer 7 of 35-micron thickness. On this layer 7, a layer of aluminum was deposited by vacuum evaporation to form a second electrode 8. The dielectric breakdown voltage of the electroluminescent element fabricated in this manner was as high as 350 volts at 50 cycles, and the luminance with an impressed voltage of 100 volts was 13 radluxes, which was 1.5 times that of a luminescent panel of the same construction in which cyanoethyl cellulose was used when said panel was lit under the same conditions. Under the same conditions, this luminance was 2.5 times that of a panel in which nitrocellulose was used. Accordingly, it was possible to produce an electroluminescent element exhibiting high luminance particularly at low frequency and low voltage.

Example 4

100 parts of zinc sulphide phosphors having electroluminescent property were mixed with 100 parts of polyvinyl alcohol α-d-cyanoethylhexyl ether having a degree of cyanoethylation of 0.5 and polymerization of 1,500 and having a structure represented by the following formula:

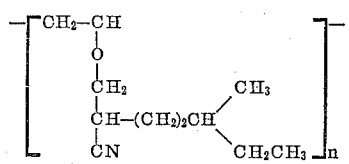

The resulting mixture was dissolved in a mixture solvent of acetone, diacetone alcohol, and hexanone, and the resulting solution was painted on a transparent, conductive glass plate and dried to form a luminescent layer of approximately 40-micron thickness. The moisture content within this layer was then removed by a heating treatment, and, at the same time, as the adhesivity of the layer was maintained, a sheet of tin foil was placed in contact thereon and caused to adhere thereto by roll pressing thereby to form a second electrode.

The electroluminescent panel fabricated in this manner had an initial luminance of from 30 to 40 radluxes at a voltage of 100 volts and frequency of 50 c./s. which is several times that of an electroluminescent element in which an epoxy resin is used, and the same electrode gap is provided.

Example 5

100 parts (by weight) of cyanoethyl sucrose were added to 100 parts (by weight) of polyvinyl alcohol cyanoethyl ether of a degree of cyanoethylation of 0.96 and polymerization of 1,700, and 200 parts (by weight) of zinc sulphide phosphors having electroluminescent property were further mixed therewith. The resulting mixture was dissolved in a solvent consisting of acetone and acetonitrile, and the resulting solution was painted on a plate of transparent conductive glass and dried to form a luminescent layer of 25-micron thickness.

Next, a solution prepared by dissolving in acetone a 1:4 mixture (by weight) of polyvinyl alcohol cyanoethyl ether and barium titanate was painted on the above said luminescent layer and dried to form a reflective layer of 10-micron thickness, whereby a total layer thickness of 35 microns was obtained. A thin aluminum layer was then deposited by vacuum evaporation on the reflective layer to form a second electrode.

The electroluminescent element fabricated in this manner has a breakdown voltage between electrodes of 260 volts and a luminance of 40 radluxes at 100 volts and 50 c./s.

This element was further subjected to a suitable moisture-proofing treatment and then to a successive lighting test (continuous lighting test), whereupon it exhibited the characteristic of reaching a luminance of 50 radluxes after 200 hours and a luminance exceeding the initial luminance over several hundreds of hours. This luminance is approximately ten times that of a similar luminescent element fabricated with the use of an epoxy resin and provided with the same electrode gap.

Example 6

100 parts (by weight) of polyvinyl alcohol β, β-cyanohexylethyl ether of a degree of cyanoethylation of 0.7 and polymerization of 1,500 having a structure representable by

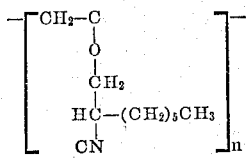

and 100 parts (by weight) of cis-3,6-endo-methylene-$\Delta^4$-tetrahydro-phthalic acid d-cyanoethylester were mixed, and 150 parts (by weight) of electroluminescent zinc sulphide phosphors were added thereto. The resulting mixture was dissolved in a mixed solvent of acetone, acetonitrile, and α-acetone-alcohol, and the resulting solution was painted on a transparent, conductive glass plate to form a luminescent layer of approximately 30-micron thickness.

Next, this layer was covered by a further layer (of approximately 10-micron thickness) of a high dielectric constant layer consisting of 100 parts (by weight) of polyvinyl alcohol β, β-cyanohexylethyl ether and 600 parts (by weight) of lead barium zirconate. A second electrode was then formed thereon by vacuum evaporation of aluminum, whereby an electroluminescent panel was produced. The breakdown voltage between electrodes of this panel was 350 volts or higher at 50 to 60 c./s., and the luminance was 35 radluxes when the panel was supplied with 100 volts at 50 c./s.

Example 7

A mixture was formed by adding 200 parts of cyanoethyl sucrose to 100 parts (by weight) of polyvinyl alcohol β, β-cyanobutylethyl ether of 0.76 cyanoethylation and polymerization of 1,500 having a structure representable by the following formula.

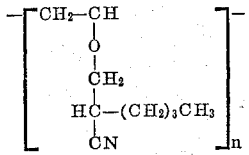

This mixture was used as the binder resin for forming the luminescent layer in the process set forth in the preceding Example 6, and an electroluminescent panel was fabricated by the same process as described in Example 6. This panel, also, exhibited high luminance, the luminance being approximately 30 radluxes at 100 volts and 50 c./s. A luminescent panel of the same construction in which polyvinyl chloride is used instead of polyvinyl alcohol β, β-cyanobutylethyl ether exhibits a luminance of only approximately 15 radluxes at 100 volts and 50 c./s.

It has been found that the electronic devices according to the present invention as described above have numerous advantages over known devices of like type such as high dielectric constant of the dielectric matrix layer, low tan δ value, relatively good adhesivity with respect to glass and metals whereby self pealing does not occur, almost no occurence of pinholes and blushing, high plasticity, high breakdown voltage, and low moisture absorption. Accordingly, the electronic devices according to the invention can be miniaturized, and the production thereof is facilitated. Furthermore, since the transparency produced is extremely good, the invention is highly suitable for application to electroluminescent devices, and, moreover, the luminance of the electroluminescence thereof is high.

The electronic devices according to the invention are, of course, not limited to the above described examples, and similar desirable results can be achieved also in the case of polyvinyl alcohols wherein the hydrogen atom of the OH radical is substituted by a cyanoalkyl radical representable by the general formula $C_nH_{2n}CN$, particularly in the case of $n \leq 8$.

Accordingly, it should be understood that the foregoing disclosure relates to only preferred embodiments of the invention and that it is intended to cover all changes and modifications of the examples of the invention herein chosen for the purposes of the disclosure, which do not constitute departures from the spirit and scope of the invention as set forth in the appended claims.

What we claim is:

1. In an electronic device comprising at least a pair of mutually opposed electrodes, one of which is transparent, and a luminescent layer of a dielectric material on which an electro-luminescent phosphor substance is dispersed, an improvement wherein said dielectric material is composed of a first substance selected from the group consisting of polyvinyl alcohol cyano-ethyl ether, polyvinyl alcohol-β, β-cyano-hexylethyl ether, and polyvinyl alcohol-β, β-cyano-butylethyl ether, and a second substance selected from the group consisting of cyanoethyl sucrose and cis-3,6 - endo-methylene-$\Delta^4$-tetrahydrophthalic acid d-cyano-ethyl ester.

2. The electronic device according to claim 1, wherein the compositional ratio of said first and second substances constituting the dielectric material ranges from 1:1 to 1:2.

References Cited

UNITED STATES PATENTS

| | | | |
|---|---|---|---|
| 3,167,677 | 1/1965 | Fremuth | 313—108 |
| 3,194,798 | 7/1965 | Frost | 260—91.3 |
| 3,213,341 | 10/1965 | Scotti et al. | 317—258 |
| 3,214,622 | 10/1965 | D'Errico et al. | 313—108 |

LEON D. ROSDOL, *Primary Examiner.*

J. D. WELSH, *Assistant Examiner.*